United States Patent
Gao et al.

(10) Patent No.: US 11,231,537 B2
(45) Date of Patent: Jan. 25, 2022

(54) DISPLAY APPARATUS AND METHOD FOR CONTROLLING THE SAME

(71) Applicant: BOE TECHNOLOGY GROUP CO., LTD., Beijing (CN)

(72) Inventors: Jian Gao, Beijing (CN); Xiaochuan Chen, Beijing (CN); Wei Wang, Beijing (CN); Pengxia Liang, Beijing (CN); Jifeng Tan, Beijing (CN); Xiandong Meng, Beijing (CN); Xianqin Meng, Beijing (CN); Fangzhou Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 337 days.

(21) Appl. No.: 16/397,040

(22) Filed: Apr. 29, 2019

(65) Prior Publication Data
US 2020/0033524 A1 Jan. 30, 2020

(30) Foreign Application Priority Data
Jul. 27, 2018 (CN) .......................... 201810846360.1

(51) Int. Cl.
*G02F 1/1335* (2006.01)
*G02F 1/29* (2006.01)
(Continued)

(52) U.S. Cl.
CPC ............ *G02B 6/003* (2013.01); *G02B 6/0053* (2013.01); *G02B 27/126* (2013.01); *G02F 1/133526* (2013.01); *G02F 1/133528* (2013.01)

(58) Field of Classification Search
CPC ..... G02F 1/294; G02F 1/133526; G02B 3/14; G02B 5/188; G02B 5/1885
See application file for complete search history.

(56) References Cited

U.S. PATENT DOCUMENTS 5,579,136 A * 11/1996 Fukui .................... G02F 1/1393
349/74
2005/0180687 A1 8/2005 Amitai
(Continued)

FOREIGN PATENT DOCUMENTS

CN 1650215 A 8/2005
CN 102193202 A 9/2011
(Continued)

OTHER PUBLICATIONS

First Office Action for Chinese Application No. 201810846360.1, dated Apr. 22, 2020, 8 Pages.

*Primary Examiner* — Lauren Nguyen
*Assistant Examiner* — Anthony G Quash
(74) *Attorney, Agent, or Firm* — Brooks Kushman P.C.

(57) ABSTRACT

A display apparatus and a method for controlling the same are provided. The display apparatus includes: a light guide module comprising a light incident region and a light emergent region; a display module, arranged corresponding to the light incident region of the light guide module and configured to display images; and a liquid crystal lens with a plurality of adjustable focal lengths, arranged between the display module and the light guide module and corresponding to the light incident region of the light guide module, and configured to form virtual images with different depths of field for the images displayed on the display module. The light guide module is configured to guide light exited from the liquid crystal lens to propagate in a direction from the light incident region to the light emergent region within the light guide module.

16 Claims, 7 Drawing Sheets

(51) Int. Cl.
  *G02F 1/1347* (2006.01)
  *F21V 8/00* (2006.01)
  *G02B 27/12* (2006.01)

(56) References Cited

U.S. PATENT DOCUMENTS

| | | |
|---|---|---|
| 2007/0296896 A1 | 12/2007 | Hong et al. |
| 2011/0228181 A1 | 9/2011 | Jeong et al. |
| 2012/0127062 A1 | 5/2012 | Bar-Zeev et al. |
| 2015/0316820 A1* | 11/2015 | Duston .................. G02B 30/00 349/138 |
| 2018/0095284 A1 | 4/2018 | Welch et al. |
| 2018/0203324 A1* | 7/2018 | Li .............................. G02F 1/29 |
| 2019/0094650 A1 | 3/2019 | Gao et al. |
| 2019/0129168 A1* | 5/2019 | Tan ........................ G02B 26/06 |
| 2019/0302567 A1* | 10/2019 | Chen ................. G02F 1/133526 |
| 2019/0379868 A1 | 12/2019 | Lin et al. |
| 2020/0018962 A1* | 1/2020 | Lu ....................... G02B 27/0172 |
| 2020/0159019 A1* | 5/2020 | Wang ................ G02F 1/133526 |

FOREIGN PATENT DOCUMENTS

| | | | |
|---|---|---|---|
| CN | 102445756 A | 5/2012 | |
| CN | 106537219 A | 3/2017 | |
| CN | 106707518 A | 5/2017 | |
| CN | 107329309 A | 11/2017 | |
| CN | 107367845 A | 11/2017 | |
| CN | 107479248 A | 12/2017 | |
| CN | 107908013 A | 4/2018 | |
| CN | 108287409 A | 7/2018 | |
| WO | WO-2018106253 A1 * | 6/2018 | ........... G02B 6/3522 |

\* cited by examiner

DISPLAY APPARATUS AND METHOD FOR CONTROLLING THE SAME

CROSS-REFERENCE TO RELATED APPLICATION

This application claims priority to Chinese Patent Application No. 201810846360.1 filed on Jul. 27, 2018, which is incorporated herein by reference in its entirety.

TECHNICAL FIELD

The present disclosure relates to the field of display technology, and in particular to a display apparatus and a method for controlling the same.

BACKGROUND

Currently, virtual reality (VR) devices and augmented reality (AR) devices are widely used. However, the size of a VR or an AR device is large, and it is difficult to flatten the overall device, which increases the difficulty of mechanical structure designing; and the function thereof is simple, as the spatial depth of imaging is not adjustable.

SUMMARY

A display apparatus is provided in a first aspect of the present disclosure, which includes:

a light guide module including a light incident region and a light emergent region;

a display module, arranged corresponding to the light incident region of the light guide module and configured to display images; and a liquid crystal lens with multiple adjustable focal lengths, arranged between the display module and the light guide module and corresponding to the light incident region of the light guide module and configured to form virtual images with different depths of field for the images displayed on the display module, where the light guide module is configured to guide light emergent from the liquid crystal lens to propagate in a direction from the light incident region to the light emergent region within the light guide module.

In some optional embodiments, the liquid crystal lens includes:

a first transparent electrode layer and a second transparent electrode layer that are stacked; and a liquid crystal layer between the first transparent electrode layer and the second transparent electrode layer;

where the second transparent electrode layer includes a first electrode sub-layer and a second electrode sub-layer that are stacked in sequence; and the first transparent electrode layer is of a plate-like structure, the first electrode sub-layer includes N concentric first annular electrodes, and the second electrode sub-layer includes N concentric second annular electrodes, where N is a positive integer and the first annular electrodes and the second annular electrodes are alternately spaced in a direction parallel with the first transparent electrode layer.

In some optional embodiments, a first non-electrode region is formed between each two adjacent first annular electrodes, a second non-electrode region is formed between each two adjacent second annular electrodes, and orthographic projections of the first annular electrodes on a first transparent substrate coincide with orthographic projections of second non-electrode regions on the first transparent substrate.

In some optional embodiments, a thickness of the liquid crystal layer is:

$$d = \frac{\lambda/2}{n_e - n_o},$$

where $n_e$ is a liquid crystal refractive index for incident light with a polarization direction parallel with a long axis of a liquid crystal molecule in the liquid crystal layer, and $n_o$ is a liquid crystal refractive index for incident light with a polarization direction perpendicular to the long axis of the liquid crystal molecule in the liquid crystal layer.

In some optional embodiments, the N concentric first annular electrodes, the N concentric second annular electrodes and the liquid crystal layer form N equivalent phase grating units, and each equivalent phase grating unit includes two steps, where a first step of the two steps corresponds to the first annular electrode and a second step of the two steps corresponds to the second annular electrode;

an outer diameter of a first step of a $j^{th}$ equivalent phase grating unit is:

$$r_{j,1} = \sqrt{\frac{(2j-1)f_1'\lambda}{n_2}\left(1 - \frac{(2j-1)\lambda}{4n_2 f_1'}\right)^{1/2}};$$

an outer diameter of a second step of the $j^{th}$ equivalent phase grating unit is:

$$r_{j,2} = \sqrt{\frac{2jf_1'\lambda}{n_2}\left(1 - \frac{j\lambda}{2n_2 f_1'}\right)^{1/2}};$$

where $f_1'$ is a focal length of the liquid crystal lens, $\lambda$ is a wavelength of incident light, $n_2$ is a refractive index of an external medium in contact with a surface of the liquid crystal lens, j is a serial number of an equivalent phase grating unit numbered in such a manner as to increase in a radial direction starting from a center of the equivalent phase grating units;

a width of a $j^{th}$ first annular electrode is:

$$d_{j,1} = r_{j,1} - r_{j-1,2};\text{ and}$$

a width of a $j^{th}$ second annular electrode is:

$$d_{j,2} = r_{j,2} - r_{j-1,2}.$$

In some optional embodiments, the liquid crystal lends further includes a power supply module, where each first annular electrode and each second annular electrode are respectively provided with power supply wires, and the power module is configured to control power supply states of each first annular electrode and each second annular electrode independently through respective power supply wires to achieve the multiple adjustable focal lengths of the liquid crystal lens.

In some optional embodiments, the display apparatus further includes a power supply module, where each first annular electrode and each second annular electrode are respectively provided with power supply wires, and the power module is configured to control power supply states of each first annular electrode and each second annular electrode independently through respective power supply wires to achieve multiple adjustable focal lengths of the liquid crystal lens.

In some optional embodiments, the power supply module is configured to:

power on the first transparent electrode layer; and divide the 2N annular electrodes in the second transparent electrode layer into x electrode groups, where each electrode group includes m adjacent annular electrodes and x=int (2N/m), number the x electrode groups in sequence in a radial direction starting from a center of the annular electrode, and power off the odd-numbered electrode groups and power on the even-numbered electrodes groups, whereby an equivalent focal length of the liquid crystal lens is:

$$f_m = m * f_1,$$

where $f_1$ is a minimum focal length of the liquid crystal lens and m is a positive integer smaller than N.

In some optional embodiment, the liquid crystal lens further includes a polarizer at a side of the first transparent electrode layer or the second transparent electrode layer close to the display module, where a transmission axis of the polarizer is parallel with an initial alignment orientation of liquid crystal molecules in the liquid crystal layer.

In some optional embodiments, the liquid crystal lens further includes a first transparent substrate at a side of the first transparent electrode layer away from the liquid crystal layer, and a second transparent substrate at a side of the second transparent electrode layer away from the liquid crystal layer, where a polarizer is arranged at a side of the second transparent substrate away from the second transparent electrode layer.

In some optional embodiments, the light guide module includes:

a light guide plate;

a light guide-in grating, arranged corresponding to the light incident region and at a side of the light guide plate facing away from the liquid crystal lens, and configured to guide light from the liquid crystal lens into the light guide plate; and a light guide-out grating, arranged corresponding to the light emergent region and at a same side with the light guide-in grating, and configured to guide the light in the light guide plate to an eye of a user.

In some optional embodiments, the light guide module includes a first polarizing splitter prism and a second polarizing splitter prism respectively at the light incident region and the light emergent region. The first polarizing splitter prism is configured to reflect light from the liquid crystal lens with multiple adjustable lens to the second polarizing splitter prism, and the second polarizing splitter prism is configured to reflect light from the first polarizing splitter prism into the eye of the user.

In some optional embodiments, ambient light is incident on a side of the light guide-out grating away from the eye of the user, and the light guide-out grating is configured to guide zero-order diffraction light of the ambient light into the eye of the user.

In some optional embodiments, the second polarizing splitter prism is further configured to transmit ambient light into the eye of the user.

In some optional embodiments, a distance between the display module and the liquid crystal lens is smaller than or equal to the minimum focal length adjustable of the liquid crystal lens.

In some optional embodiments, a maximum half angle of view of the display apparatus is:

$$\omega(d)_{max} = \arcsin\left(\frac{n-1}{2}\right)$$

where $\omega(d)_{max}$ is the maximum half angle of view, n is a refractive index of the light guide plate and a grating constant corresponding to the maximum half angle of view is $$d = \frac{2\lambda}{n+1}.$$

A method for controlling a display apparatus is further provided according to a second aspect of the present disclosure. The display apparatus includes a liquid crystal lens with multiple adjustable focal lengths, and the liquid crystal lens includes a first transparent electrode layer and a second transparent electrode layer which are arranged in a stacked manner; and a liquid crystal layer between the first transparent electrode layer and the second transparent electrode layer. The second transparent electrode layer includes a first electrode sub-layer and a second electrode sub-layer which are arranged in a stacked manner. The first electrode sub-layer includes N concentric first annular electrodes, and the second electrode sub-layer includes N concentric second annular electrodes, where N is a positive integer and the first annular electrodes and the second annular electrodes are alternately spaced in a direction parallel with the first transparent electrode layer. The method includes:

powering on the first transparent electrode layer; and dividing the 2N annular electrodes into x electrode groups, where each electrode group includes m adjacent annular electrodes and x=int (2N/m), numbering the x electrode groups in sequence in a radial direction starting from a center of the annular electrode, and powering off the odd-numbered electrode groups and powering on the even-numbered electrodes groups, whereby an equivalent focal length of the liquid crystal lens with a plurality of adjustable focal lengths is:

$$f_m = m * f_1,$$

where $f_1$ is a minimum focal length of the liquid crystal lens and m is a positive integer smaller than N.

BRIEF DESCRIPTION OF THE DRAWINGS

In order to clarify the technical solutions according to the embodiments of the present disclosure or conventional art, the appended drawings involved in the description of the following embodiments are briefly introduced hereinafter. Apparently, the drawings only illustrate some embodiments of the present disclosure, and other drawings may be obtained based on these drawings by those skilled in the art without any inventive efforts.

DETAILED DESCRIPTION

Figure 1:
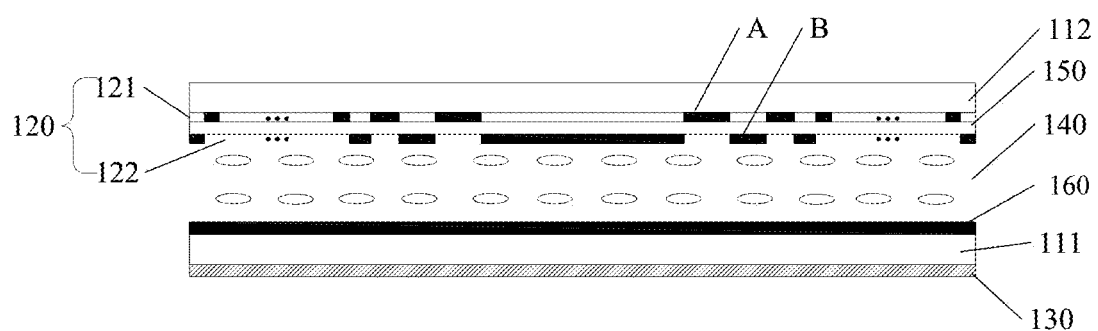
FIG. 1 is a schematic structural diagram of a liquid crystal lens according to an embodiment of the present disclosure.

In order to clearly clarify the present disclosure, descriptions are made in conjunction with some optional embodiments and the drawings. Similar parts in different drawings are denoted by same legends. It should be well appreciated by those skilled in the art the following descriptions are intended for purpose of illustration rather than limitation, and the scope of the present discloser is not limited by the descriptions.

Various cross-sectional views in the embodiments of the present disclosure are shown in the drawings. The figures are not drawn to scale, and some details are magnified for clarity of illustration and some details may be omitted. The various regions, the shapes of the layers, and the relative size and positional relationship between them are merely exemplary, and may actually be deviated due to manufacturing tolerances or technical limitations, and those skilled in the art may design regions/layers having different shapes, sizes, and relative positions on practical demands.

In virtual reality (VR) or augmented reality (AR) display technology, a display module as an image source is used in conjunction with a magnifying glass, and an image displayed by the display module is magnified by the magnifying glass to form a magnified virtual image for viewing of a user. In general, an AR display device may include a display panel, an imaging lens (as a magnifying glass), and a light guide structure. The display panel is located within a focal length of the imaging lens, so that the imaging lens forms a magnified virtual image of an object displayed on the display panel. The light guide structure may introduce both the imaging light from the display panel and ambient light into a human eye to form AR display. A VR display device is similar to the AR display device in that a virtual image of the object is formed by placing the display panel within the focal length of the imaging lens, except that the VR display device is opaque to ambient light.

The imaging lens in related art has a fixed focal length, which only allows imaging in one spatial depth and thus cannot realize image in multiple spatial depths, and has a large spatial volume, with which it is difficult to flatten the whole device, thereby increasing the difficulty of mechanical structure design.

In view of the above, a liquid crystal lens with multiple adjustable focal lengths is provided according to an embodiment of the present disclosure. FIG. 1 shows a schematic structural diagram of the liquid crystal lens according to an embodiment of the present disclosure. The liquid crystal lens includes: a first transparent substrate 111 and a second transparent substrate 112 which are aligned to each other; a liquid crystal layer 140 arranged between the first transparent substrate 111 and the second transparent substrate 112; a first transparent electrode layer 160 arranged between the first transparent substrate 111 and the liquid crystal layer 140; and a second transparent electrode layer 120 arranged between the second transparent substrate 112 and the liquid crystal layer 140. The second transparent electrode layer 120 includes a first electrode sub-layer 121 and a second electrode sub-layer 122 which are arranged in a stacked manner in sequence.

The first electrode sub-layer 121 includes N concentric first annular electrodes A, and a first non-electrode region is formed between each two adjacent first annular electrodes A, where N is a positive integer. The second electrode sub-layer 122 includes second annular electrodes B, each of which is arranged corresponding to a first non-electrode region, and a second non-electrode region is formed between each two adjacent second annular electrodes. The first annular electrodes A and the second annular electrodes B are alternately spaced in a direction parallel with the first transparent electrode layer.

In some optional embodiments, orthographic projections of the first annular electrodes A onto the first transparent substrate 111 coincide with those of the second non-electrode regions onto the first transparent substrate 111.

In some optional embodiments, orthographic projections of the first non-electrode regions onto the first transparent substrate 111 or the second transparent substrate 112 coincide with those of the second annular electrodes B onto the first transparent substrate 111 or the second transparent substrate 112.

In some optional embodiments, the first annular electrodes A and the second annular electrodes B of the first transparent electrode layer 160, and the second transparent electrode layer 120 may be made of indium tin oxide (known as ITO).

Figure 2:
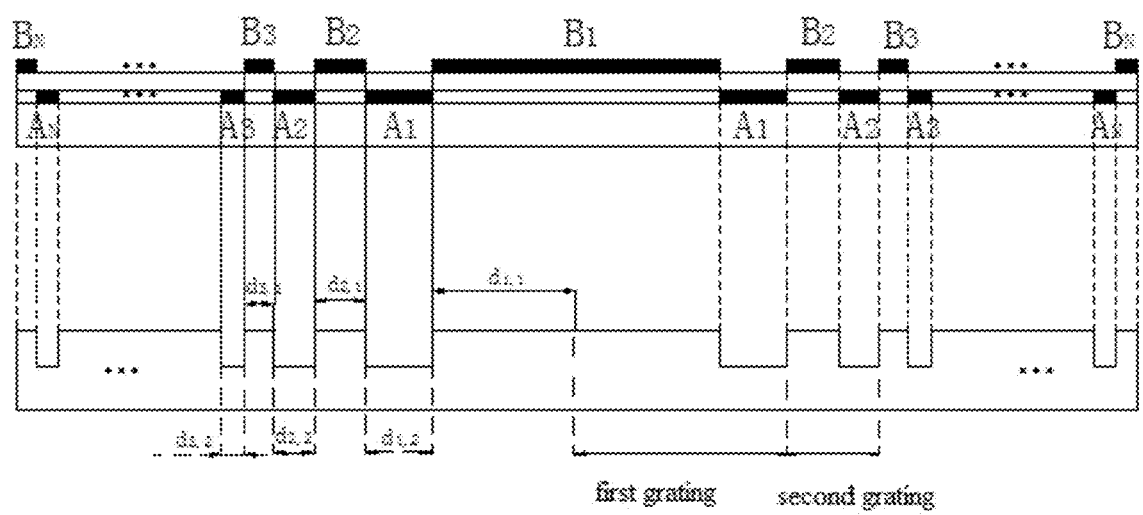
FIG. 2 is a schematic partial diagram of a first electrode sub-layer and a second electrode sub-layer according to an embodiment of the present disclosure.
Figure 3:
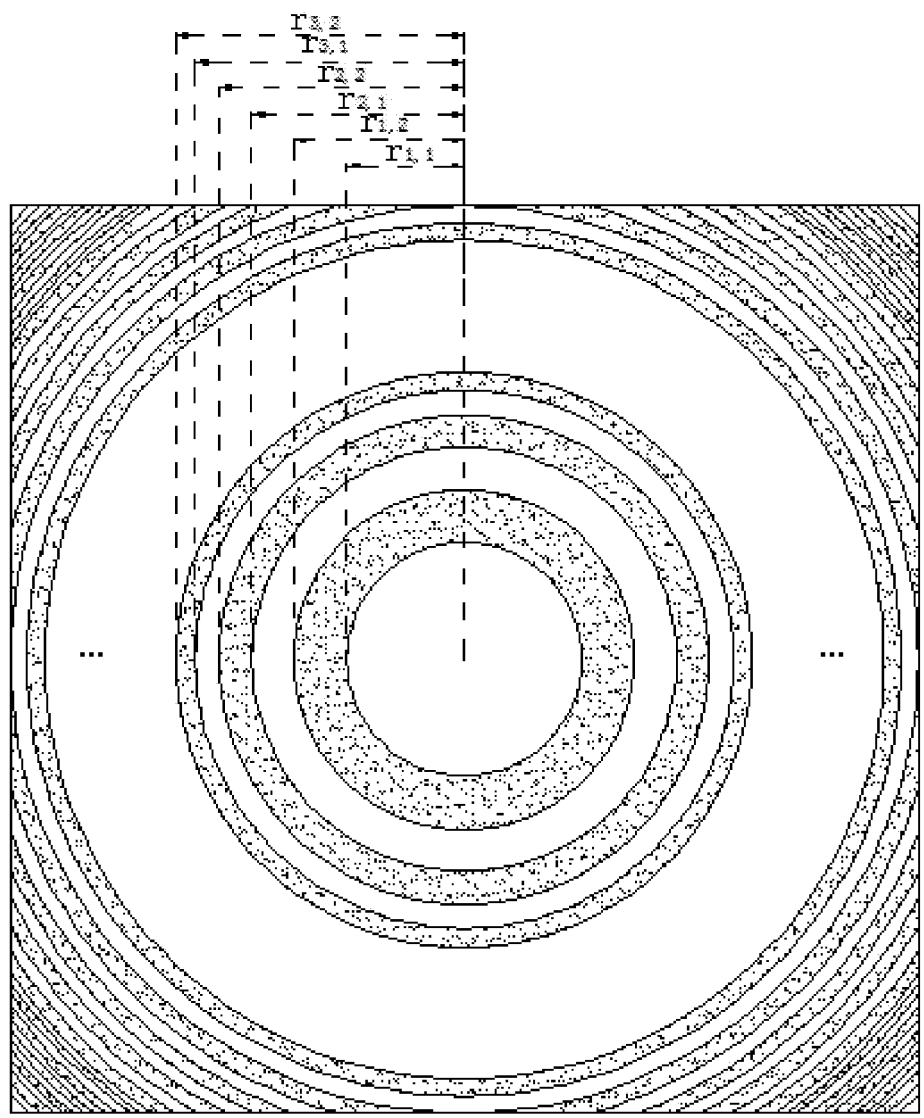
FIG. 3 is a top view of FIG. 2 according to the present disclosure.

In some optional embodiments, as shown in FIGS. 2 and 3, the N concentric first annular electrodes A, the N concentric second annular electrodes B and the liquid crystal layer form N equivalent phase grating units, where each grating unit is of a two-step shape. A phase difference between adjacent steps is π, and a step height is $$l = \frac{\lambda/2}{n_1 - n_2},$$

where λ is a wavelength of incident light (λ=587 nm in a case that the incident light is polychromatic light of white color), $n_1$ is a refractive index of a diffractive lens and $n_2$ is a refractive index of an ambient medium in contact with an outer surface of the diffractive lens (typically the ambient medium is air and the refractive index thereof $n_2$=1).

With reference to FIG. 2, the annular electrodes A are numbered $A_1, A_2, A_3 \ldots A_N$ sequentially from the center to both sides, and the annular electrodes B are numbered $B_1, B_2, B_3 \ldots B_N$ sequentially from the center to both sides. Regions between adjacent first annular electrodes are provided with no electrodes, and thus form the first non-electrode regions, and similarly, regions between adjacent second annular electrodes are provided with no electrodes and thus form the second non-electrode regions. Each equivalent phase grating unit includes two steps, where a first step corresponds to a first annular electrode, and a second step corresponds to a second annular electrode. According to the properties of a diffractive lens, an outer diameter of a first step of a $j^{th}$ equivalent phase grating unit may be calculated according to the following formula:

$$r_{j,1} = \left[\left(f_1' + \frac{(2j-1)\lambda/2}{n_2}\right)^2 - f_1'^2\right]^{1/2} = \sqrt{\frac{(2j-1)f_1'\lambda}{n_2}}\left(1 - \frac{(2j-1)\lambda}{4n_2 f_1'}\right)^{1/2},$$

and an outer diameter of a second step of $j^{th}$ equivalent phase grating unit can be calculated according to the following formula:

$$r_{j,2} = \left[\left(f_1' + \frac{j\lambda}{n_2}\right)^2 - f_1'^2\right]^{1/2} = \sqrt{\frac{2jf_1'\lambda}{n_2}}\left(1 - \frac{j\lambda}{2n_2 f_1'}\right)^{1/2},$$

where $f_1'$ is a minimum focal length of the liquid crystal lens, $\lambda$ is a wavelength of incident light ($\lambda$=587 nm in a case that the incident light is polychromatic light of white color), $n_2$ is a refractive index of an external medium in contact with a surface of the liquid crystal lens, j is a serial number of an equivalent phase grating unit numbered in such a manner as to increase in a radial direction starting from a center of the equivalent phase grating units Based on the above, a width $d_{j,1}$ of a $j^{th}$ second annular electrode and a width $d_{j,2}$ of $j^{th}$ first annular electrode are calculated according to the following formulas, respectively:

$$d_{j,1}=r_{j,1}-r_{j-1,2};$$

$$d_{j,2}=r_{j,2}-r_{j,1}.$$

With the minimum focal length $f_1'$ of the liquid crystal lens, the wavelength $\lambda$ of the incident light and the refractive index of the external medium $n_2$ being known, it can be calculated according to the foregoing formulas that a width of the first first annular electrode $A_1$ is $d_{1,2}$, a width of the second first annular electrode $A_2$ is $d_{2,2}$, a width of the $N^{th}$ first annular electrode $A_N$ is $d_{N,2}$, a width of the first second annular electrode $B_1$ is $2*d_{1,1}$, a width of the second second annular electrode $B_2$ is $d_{2,1}$, and a width of the $N^{th}$ second annular electrode $B_N$ is $d_{N,1}$, where widths of other annular electrodes can be obtained similarly and are thus not described herein.

In an embodiment of the present disclosure, as shown in FIG. 1, the first second annular electrode $B_1$ is arranged at the center of the N concentric equivalent phase grating units.

Figure 4:
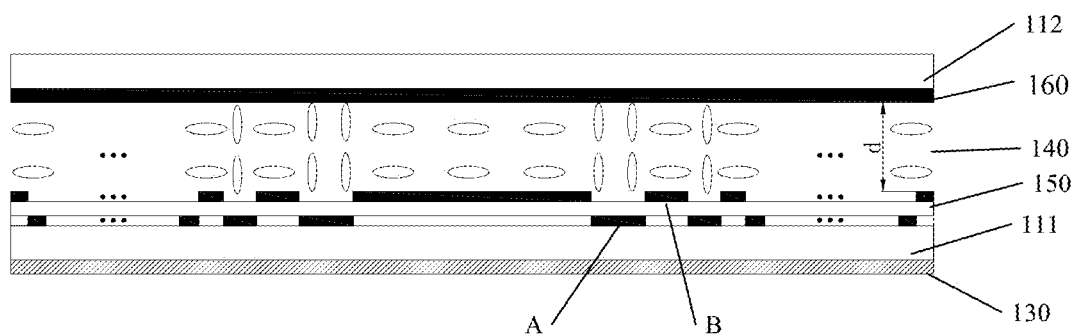
FIG. 4 is a schematic structural diagram of a liquid crystal lens in which some liquid crystal molecules are deflected according to an embodiment of the present disclosure.
Figure 5:
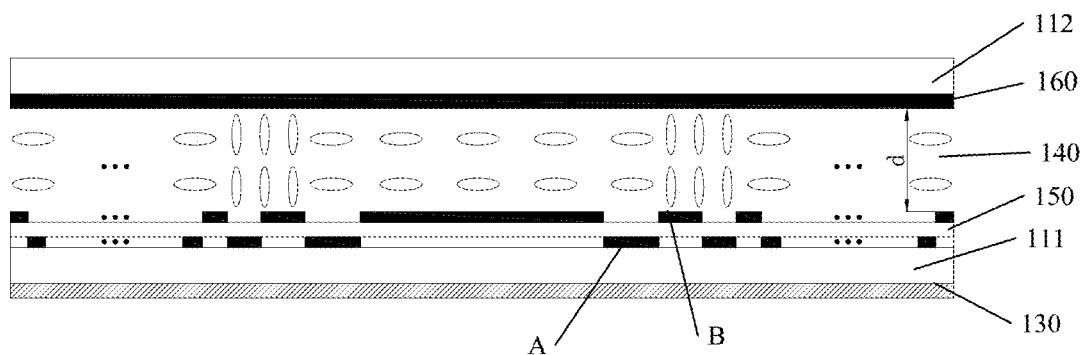
FIG. 5 is a schematic structural diagram of a liquid crystal lens in which some liquid crystal molecules are deflected according to an embodiment of the present disclosure.

In some optional embodiments, assuming an initial alignment orientation of liquid crystal molecules of the liquid crystal layer is parallel with the paper (i.e., the horizontal direction in the FIG. 1), as shown in FIGS. 4 and 5, when powered on, the powered-on annular electrodes and the first transparent electrode layer 160 form an electric field to deflect liquid crystal molecules. A liquid crystal molecule has a high refractive index $n_e$ in a case that a long axis of the liquid crystal molecule is parallel with a polarization direction of incident light, and has a low refractive index $n_o$ in a case that that long axis of the liquid crystal molecule is parallel with the polarization direction of the incident light. Thus, incident light passing through the liquid crystal lens can have optical distance differences by controlling the liquid crystal lens to have different refractive indexes at different positions of the liquid crystal lens, so that the liquid crystal lens may achieve the function of diffraction and has different equivalent focal lengths.

Figure 6:
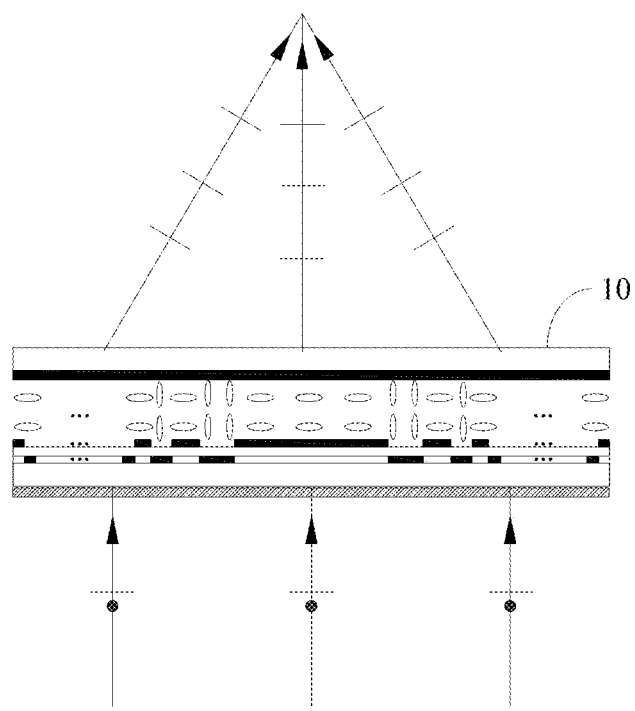
FIG. 6 is a schematic diagram showing focusing of light by a liquid crystal lens in which some liquid crystal molecules are deflected according to an embodiment of the present disclosure.

With comprehensive reference to FIGS. 1, 4 and 6, for light with a polarization direction parallel with the initial alignment orientation of the liquid crystal molecules, when powered off, a long axis of a liquid crystal molecule is parallel with the polarization direction of the incident light and a refractive index thereof is $n_e$. In a case that the first first annular electrode $A_1$, the second first annular electrode $A_2$ and the first transparent electrode layer 160 are powered on, long axes of liquid crystal molecules corresponding to the first first annular electrode $A_1$ and the second first annular electrode $A_2$ are parallel with the vertical direction as shown in FIG. 1, and in this case, the polarization direction of the incident light is perpendicular to the long axes of the liquid crystal molecules and a refractive index of the liquid crystal molecules is $n_o$. Thus, optical distances of liquid crystal molecules corresponding to the powered-on first annular electrodes $A_1$ and $A_2$ are reduced due to polarization, where an optical distance is the product of a thickness of the liquid crystal layer and a refractive index thereof. In order that liquid crystal molecules corresponding to a powered-on first annular electrode A and an adjacent powered-off first annular electrode have a fixed optical distance difference $\lambda/2$ to achieve optical diffraction, the thickness of the liquid crystal layer may be:

$$d = \frac{\lambda/2}{n_e - n_o},$$

where d is the thickness of the liquid crystal layer, $n_e$ is a liquid crystal refractive index for light with a polarization direction parallel with a long axis of a liquid crystal molecule passing through the liquid crystal molecule, and $n_o$ is a liquid crystal refractive index for light with a polarization direction perpendicular to the long axis of the liquid crystal molecule passing through the liquid crystal molecule. In this structure, adjacent phase grating units have an optical distance difference of $\lambda/2$ and thus a Fresnel half-wave retarder is formed, so that the liquid crystal lens is equivalent to a Fresnel lens, which has a light focusing function.

With comprehensive reference to FIGS. 1 and 5, the 2N annular electrodes are divided into N electrode groups, where each electrode group includes two adjacent annular electrodes (a first annular electrode A and a second annular electrode B), and the N electrode groups are numbered in sequence from the center to both sides. Odd-numbered electrode groups are powered off, and even-numbered electrode groups and the first transparent electrode layer 160 are powered on. In this way, an equivalent focal length of the diffractive lens is $2*f_1'$, where $f_1'$ is minimum focal length of the liquid crystal lens. Specifically, the first first annular electrode $A_1$ and the first second annular electrode $B_1$ in a first electrode group are powered off, and the second first annular electrode $A_2$ and the second second annular electrode $B_2$ in a second electrode group and the first transparent electrode layer 160 are powered on. In this case, long axes of liquid crystal molecules corresponding to $A_1$ and $B_1$ are parallel with the polarization direction of the incident light, i.e., the horizontal direction in FIG. 5, and a liquid crystal refractive index is $n_e$; and long axes of liquid crystal molecules corresponding to $A_2$ and $B_2$ are perpendicular to the polarization direction of the incident light, i.e., the vertical direction in FIG. 5, and a liquid crystal refractive index is $n_o$. Thus, light passing through two adjacent electrode groups has an optical distance difference of $\lambda/2$, and thus a Fresnel half-wave retarder is formed, so that the liquid crystal lens is equivalent to a two-step-shaped Fresnel lens, which has a light focusing function.

In some optional embodiments, the first transparent electrode layer is of a single-layer plate-like structure. During displaying an image, the first transparent electrode layer is kept powered on, and the first annular electrodes A and the second annular electrodes B are independently controlled to be powered on, so that liquid crystal molecules located corresponding to different electrodes have different refractive indexes and thereby the lens may have different focal lengths. The liquid crystal lens has a simple structure and powering of the electrodes can be easily controlled.

For light with a polarization direction perpendicular to the initial alignment orientation of the liquid crystal molecules and parallel with the first transparent substrate 111, i.e., light with a polarization direction perpendicular to paper in the embodiment, the long axes of the liquid crystal molecules are always perpendicular to the polarization direction of the light whether the electrodes are powered on or not, and the refractive index of the liquid crystal layer is always $n_o$. In this case, the liquid crystal layer is equivalent to a glass plate and cannot focus light.

In some embodiments, the liquid crystal lens further includes a polarizer 130 arranged at a side of the first transparent substrate 111 or the second transparent substrate 112 far away from the liquid crystal layer, and a transmission axis of the polarizer 130 is parallel with the initial alignment orientation of the liquid crystal molecules in the liquid crystal layer. In FIG. 1, it is shown that the polarizer 130 is arranged at a side of the transparent substrate 111 far away from the liquid crystal layer, notwithstanding the polarizer 130 may be also arranged at a side of the second transparent substrate 112 far away from the liquid crystal layer, as long as the polarizer 130 is located at a light emergent side of the display module, which is not limited in the present disclosure.

The polarizer 130 only allows light with a polarization direction parallel with the transmission axis to pass through, which avoids influence from light with other polarization directions. On this basis, directions of light from the display module are not limited, as long as the light from the display module has a polarization direction parallel with the transmission axis of the polarizer.

FIGS. 1-6 only illustrate some embodiments in which the initial alignment orientation of the liquid crystal layer is parallel with paper (i.e., the horizontal direction in FIGS. 1-6). In other possible embodiments, the initial alignment orientation of the liquid crystal layer may be also perpendicular to paper (i.e., the direction normal to the paper in FIGS. 1-6). The initial alignment orientation of the liquid crystal layer is not limited in the present disclosure, as long as the initial alignment orientation of the liquid crystal layer is parallel with the transmission axis of the polarizer.

In some optional embodiments, each first electrode sub-layer A and each sub-electrode B are respectively provided with power supply wires, and the liquid crystal lens further includes a power supply module configured to control power supply states of each first annular electrode and each second annular electrode independently through respective power supply wires to achieve multiple adjustable focal lengths of the liquid crystal lens.

In order to better control power supply of the first annular electrodes A and the second annular electrodes B, each first annular electrode and each second annular electrode are respectively provided with power supply wires, and the power supply module independently supplies power to each electrode through a corresponding wire. In some optional embodiments, the power supply module is configured to:

divide the 2N annular electrodes in the second transparent electrode layer into x electrode groups, where each electrode group includes m adjacent annular electrodes and x=int (2N/m), number the x electrode groups in sequence in a radial direction starting from a center of the annular electrode, and power off the odd-numbered electrode groups and power on the even-numbered electrodes groups, whereby an equivalent focal length of the liquid crystal lens is:

$$f_j = m * f_1',$$

where $f_1'$ is a minimum focal length of the liquid crystal lens, m is a positive integer smaller than N, and int means taking an integer of the number 2N/m.

Further, with comprehensive reference to FIGS. 1, 4 and 5, in order to avoid electrical interference between the first electrode sub-layer 121 and the second electrode sub-layer 122, an insulation layer 150 which has an electrical insulation function is provided between the first electrode sub-layer 121 and the second electrode sub-layer 122.

In the foregoing embodiments, step-shaped annular electrodes are provided, which renders the liquid crystal lens equivalent to a Fresnel lens, and the electrodes can be made relatively thin, where a thickness of the liquid crystal lens is comparable to the wavelength of the incident light, which facilitates lightening and thinning of the liquid crystal lens. The focal length of the liquid crystal lens can be adjusted by controlling power supply states of respective annular electrodes, and thereby an image displayed on the display module can be further imaged in multiple spatial depths. In addition, the liquid crystal lens can be combined with a light guide structure, and the light guide structure can guide imaging light into an eye of a user, thereby achieving VR display with multiple spatial depths of imaging; or the light guide structure may also guide the imaging light and real ambient light both into the eye of the user, thereby achieving AR display with multiple spatial depths of imaging. The liquid crystal lens has a flat structure, where multiple adjustable focal lengths can be achieved without involvement of multiple lenses, and it also has a smaller spatial volume, which facilitates combination with the display module and the light guide module and enables flattening of the whole device.

A display apparatus is further provided according to some embodiments of the present disclosure, which includes:

a light guide module including a light incident region and a light emergent region;

a display module 20, arranged corresponding to the light incident region of the light guide module and configured to display images;

a liquid crystal lens 10 with multiple adjustable focal lengths, that is arranged between the display module 20 and the light guide module and corresponding to the light incident region of the light guide module, and is configured to form virtual images with different depths of field for the images displayed by the display module 20, where the light guide module is configured to guide light exited from the liquid crystal lens 10 to propagate in a direction from the light incident region to the light emergent region within the light guide module.

The structure of the liquid crystal lens 10 is already shown in FIG. 1, and has the beneficial effects similar to those of the foregoing embodiments, which are thus not described in detail herein. The light guide module may include either of a light guide grating and a polarizing splitter prism.

Figure 8:
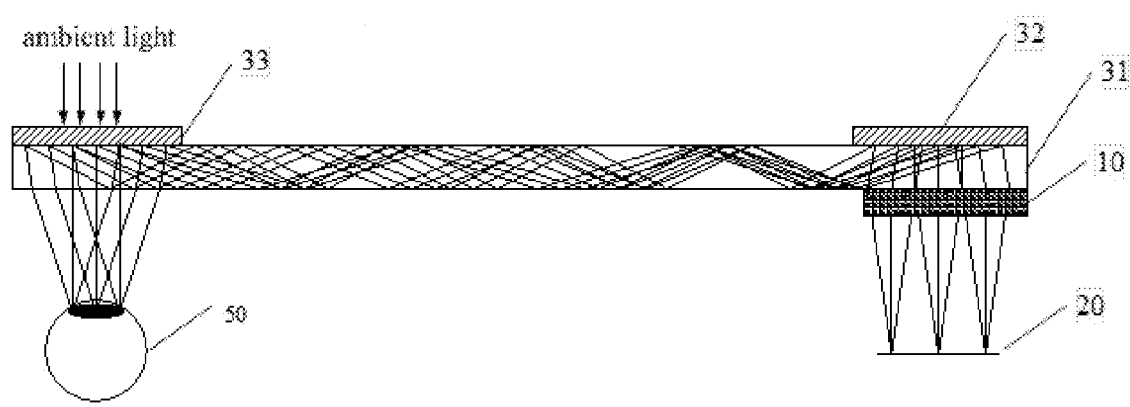
FIG. 8 is a schematic structural diagram of a display apparatus according to an embodiment of the present disclosure.

In some optional embodiments, as shown in FIG. 8, the light guide module includes: a light guide plate 31; a light guide-in grating 32, arranged corresponding to the light incident region and at a side of the light guide plate 31 facing away from the liquid crystal lens 10, and configured to guide light from the liquid crystal lens with multiple adjustable focal lengths into the light guide plate; and a light guide-out grating 33, arranged at a same side with the light guide-in grating 32 and corresponding to the light emergent region, and configured to guide the light in the light guide plate to an eye of a user. The liquid crystal lens 10 is arranged at the light incident region and is between the light guide plate 31 and the display module 20.

It should be noted that light diffracted by the liquid crystal lens 10 is mainly first-order diffraction light, and the light guide plate 31 is mainly configured to regulate a propagation direction of the first-order diffraction light.

In some embodiments, as shown in FIG. 8, the light guide-out grating 33 is further configured to guide ambient light from near the display module 20 into the eye 50 of the user, and the light guide module can achieve augmented reality display by guiding both light from the display module 20 and the ambient light from near the display module 20 into the eye 50 of the user.

It should be noted that light entering the eye 50 of the user mainly includes zero-order diffraction light of the ambient light from the light guide-out grating 33.

Figure 10:
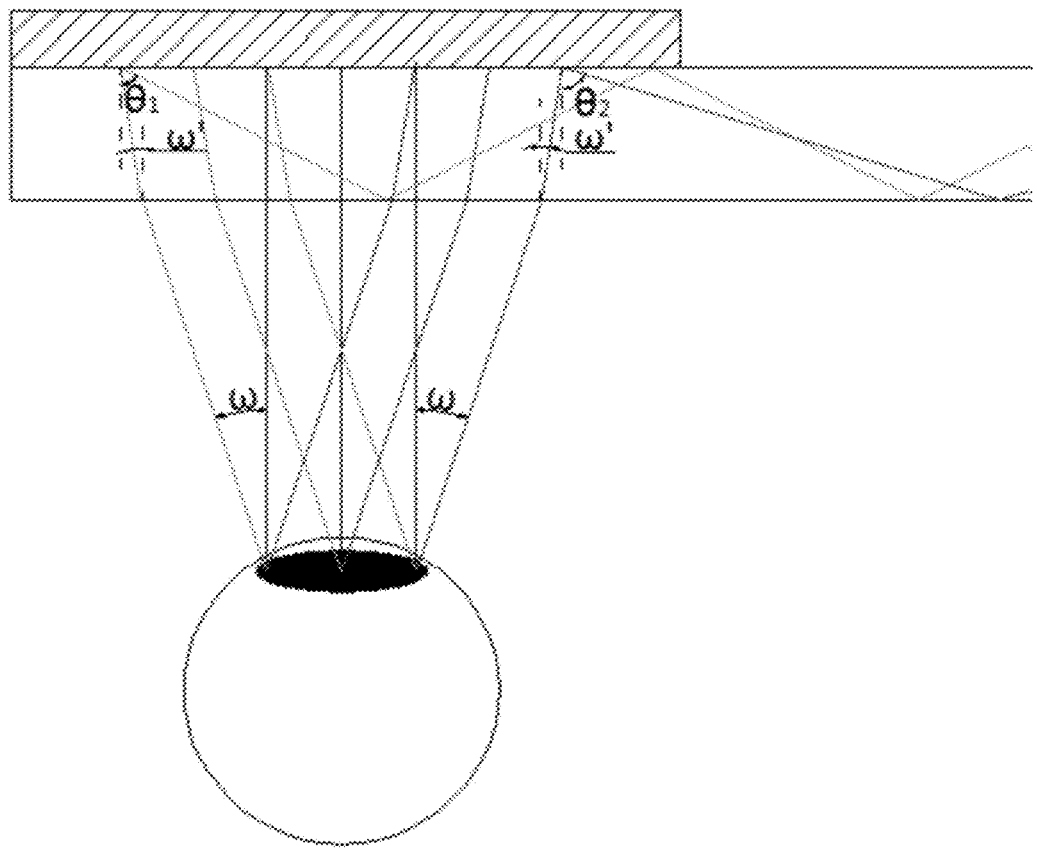
FIG. 10 is a schematic optical path diagram of light rays from a light emergent region of a light guide module according to an embodiment of the present disclosure.

In this embodiment, as shown in FIG. 10, an angle of view of AR display is determined by a grating constant and a refractive index of the light guide plate. Assuming $\omega$ to be a half angle of view of AR display and $\omega'$ to be a refraction angle in the light guide plate, according to the law of refraction, we have the following equation:

$$\sin\omega = n\sin\omega'$$

Assuming $\theta_1$ and $\theta_2$ are diffraction angles of a grating, n is the refractive index of the light guide plate and d is the grating constant (a cycle of the grating), according to the grating equation and the conditions for total reflection within the light guide plate, the foregoing parameters are related by the following mathematics:

$$nd\sin\theta_1 + nd\sin\omega' = \lambda$$
$$nd\sin\theta_2 - nd\sin\omega' = \lambda$$
$$\frac{1}{n} \leq \sin\theta_1 < 1$$
$$\frac{1}{n} \leq \sin\theta_2 < 1$$

The following inequalities can be obtained by organizing the above mathematic expressions:

$$\begin{cases} \frac{\lambda}{d} - n < \sin\omega \leq \frac{\lambda}{d} - 1 \\ 1 - \frac{\lambda}{d} \leq \sin\omega < n - \frac{\lambda}{d} \end{cases}.$$

That is, the half angle of view $\omega$ as a function of the grating constant d is defined by the following equation:

$$\omega(d) = \min\left\{\arcsin\left(\frac{\lambda}{d} - 1\right), \arcsin\left(n - \frac{\lambda}{d}\right)\right\}.$$

Figure 11:
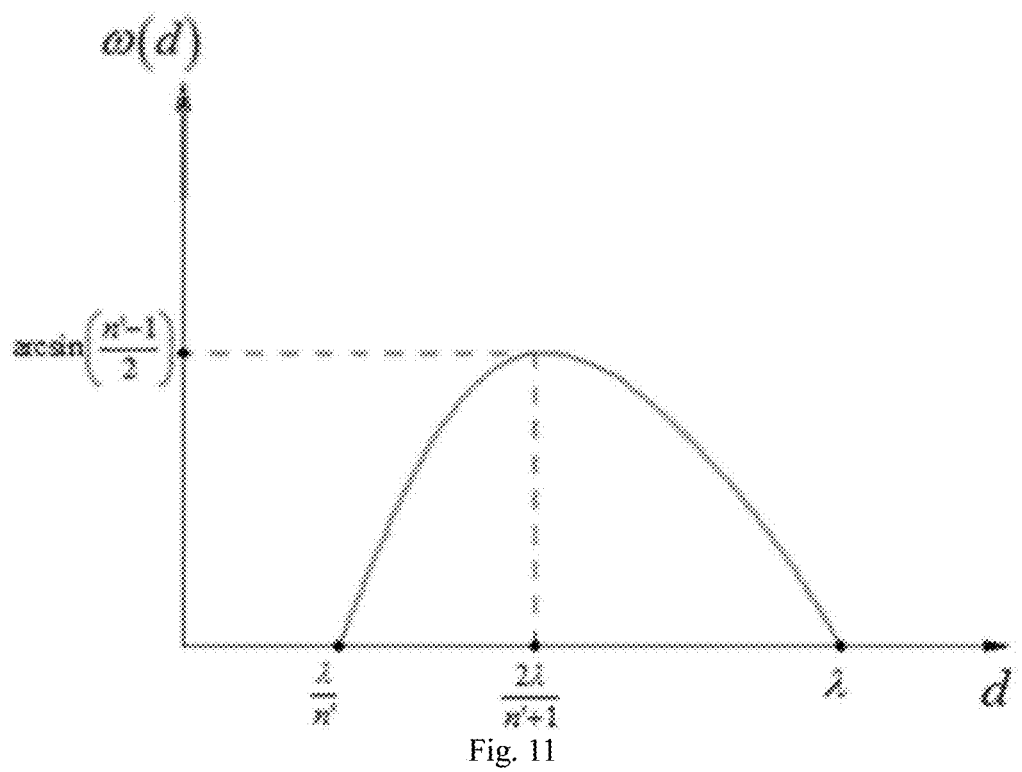
FIG. 11 is a graph showing a half angle of view as a function of grating constant according to an embodiment of the present disclosure.

The equation above may be reorganized to be a piecewise function defined by the following equation, and a graph of the function is shown in FIG. 11:

$$\omega(d) = \begin{cases} \arcsin\left(n - \frac{\lambda}{d}\right) & \frac{\lambda}{d} \leq d \leq \frac{2\lambda}{n+1} \\ \arcsin\left(\frac{\lambda}{d} - 1\right) & \frac{2\lambda}{n+1} \leq d \leq \lambda \end{cases}.$$

Thus, a maximum value of the half angle of view is determined according to the following equation with $$d = \frac{2\lambda}{n+1}:$$

$$\omega(d)_{max} = \arcsin\left(\frac{n-1}{2}\right).$$

The half angle of view determines a view scope of the display apparatus, where the greater the half angle of view is, the greater the angle of view is, and accordingly, the wider the view scope is.

Figure 9:
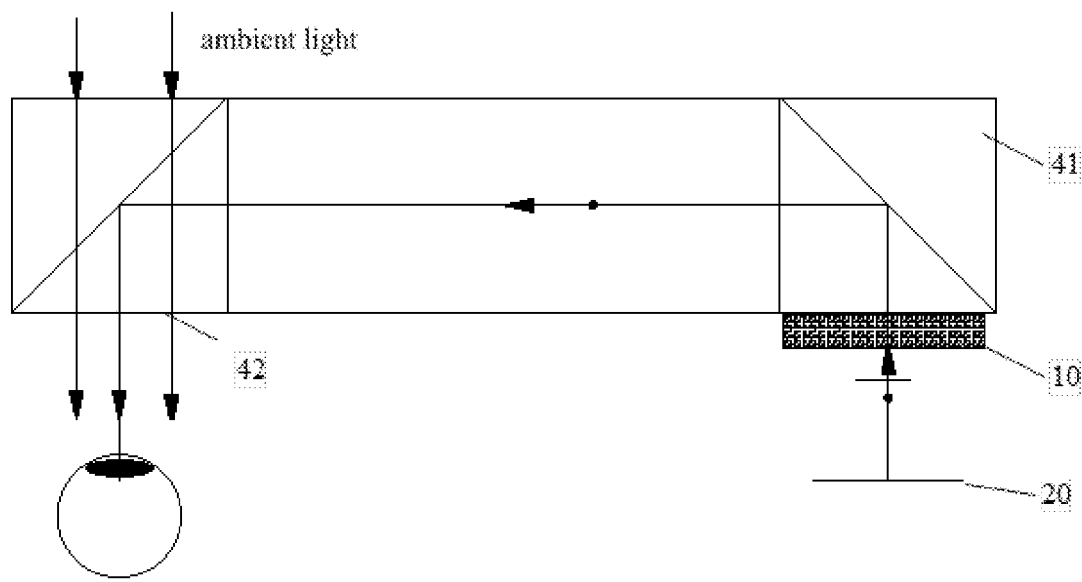
FIG. 9 is a schematic structural diagram of a display apparatus according to an embodiment of the present disclosure.

In some other embodiments, as shown in FIG. 9, the light guide module includes a first polarizing splitter prism 41 and a second polarizing splitter prism 42 which are arranged opposite to each other and respectively located at the light incident region and the light emergent region. The first polarizing splitter prism 41 is configured to reflect light from the liquid crystal lens with multiple adjustable focal lengths to the second polarizing splitter prism 42, and the second polarizing splitter prism 42 is configured to reflect light from the first polarizing splitter prism 41 to the eye 50 of the user.

In some optional embodiments, as shown in FIG. 9, the second polarizing splitter prism 42 may be further configured to transmit ambient light to the eye 50 of the user. In this way, the light guide module can achieve augmented display by guiding both the light from the display module 20 and the ambient light from near the display module 20 to the eye of the user.

Figure 12:
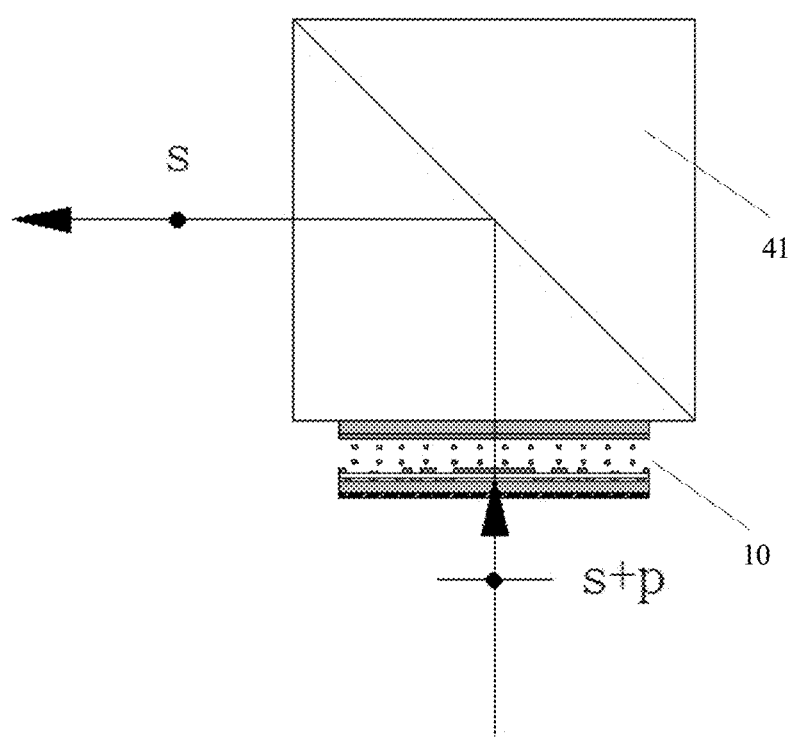
FIG. 12 is a schematic diagram showing an operating principle of a polarizing splitter prism according to an embodiment of the present disclosure.

In some optional embodiments, the polarizing splitter prism may be formed by two right-angle prisms glued together, and high-reflective optical films and low-reflective optical films are alternately layered on slopes of the right-angle prisms by vapor deposition. As shown in FIG. 12, in a case that light is incident on the optical films of the polarizing splitter prism with the Brewster angle, most p-polarized light transmits the polarizing splitter prism, and most s-polarized light is reflected at the optical films with an angle of 45 degrees. As shown in FIG. 9, the reflected light enters the second polarizing splitter prism 42, and is reflected by the second polarizing splitter prism 42 to the eye of the user. The ambient light may enter the second polarizing splitter prism 42 through a side of the second polarizing splitter prism 42 far away from the eye of the user, and be transmitted into the eye of the user. Thus, the light emitted by the display module 20 and the ambient light can both enter the eye of the user, and combined with the liquid crystal lens 10, multi-spatial-depth imaging can be achieved.

Figure 13:
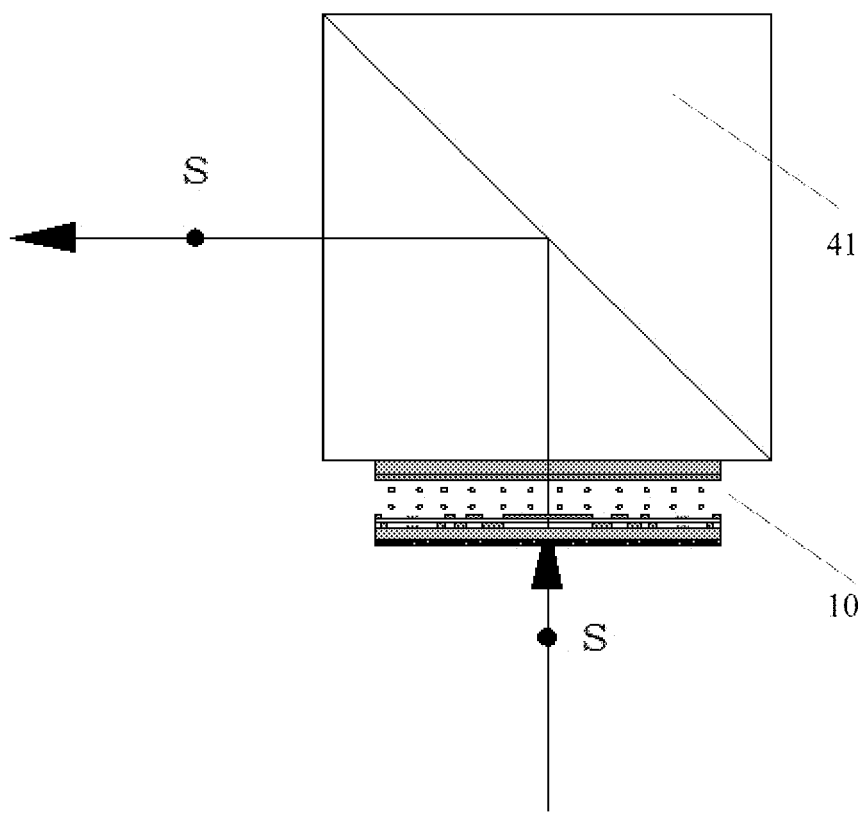
FIG. 13 is a schematic diagram showing an operating principle of a polarizing splitter prism according to an embodiment of the present disclosure.

In some optional embodiments, a polarization direction of the light from the display module 20 is designed to coincide with a transmission axis of a polarizer. For example, as shown in FIG. 13, the light from the display module only includes s-wave, and the transmission axis of the polarizer coincides with a polarization direction of the s-wave. In this way, almost all of the light transmitting from the liquid crystal lens is totally reflected by the polarizing splitter prism, which reduces loss of the light and improves luminous efficiency of the display module.

In this embodiment, the polarizing splitter prism itself has a light splitting function, and thus, can function as the polarizer above. Therefore, in this embodiment, a polarizer may be provided for the liquid crystal lens, or the liquid crystal lens may be provided with no polarizer, which simplifies the manufacture process and saves materials.

Optionally, a distance between the display module and the liquid crystal lens is not greater than the minimum focal length of the liquid crystal lens. Such a configuration can meet imaging requirements of the display module and the liquid crystal lens in a case that the focal length of the liquid crystal lens is the minimum focal length.

Figure 7:
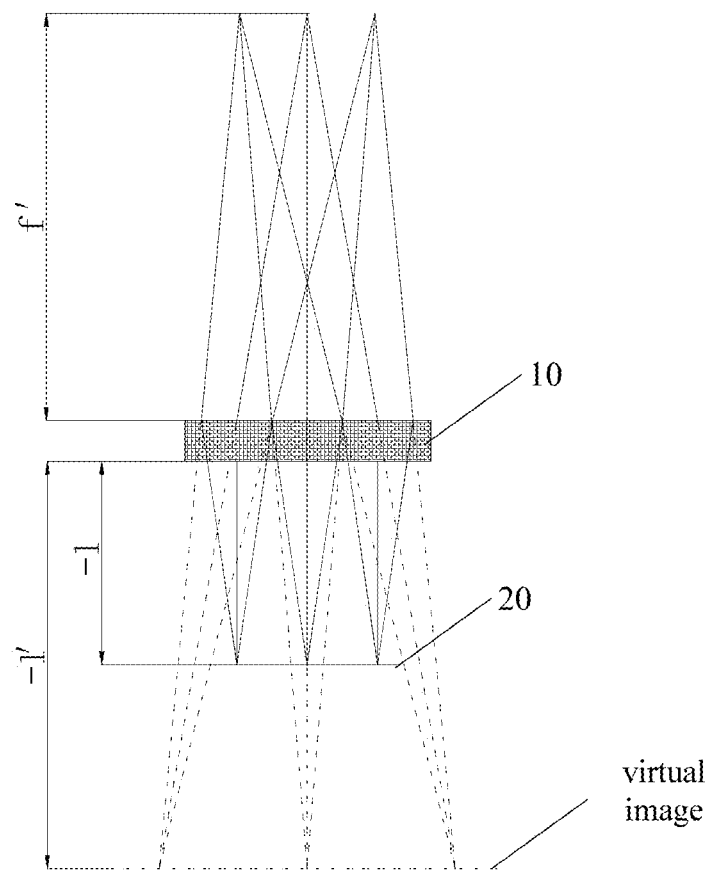
FIG. 7 is a schematic diagram showing forming multiple spatial depths of an image according to an embodiment of the present disclosure.

The liquid crystal lens 10 and the display module 20 are arranged in accordance with the configuration as shown in FIG. 7, where an object distance –l is smaller than a focal length f' of the liquid crystal lens, and in this case, the liquid crystal lens 10 forms a magnified virtual image for an image displayed on the display module 20. According to the optical object-image relationship, image distances of images formed by lenses with different focal lengths for the same display module with a fixed object distance are different, thereby forming virtual images with different spatial depths. The optical object-image relationship is expressed as the following equation:

$$\frac{1}{l'} - \frac{1}{l} = \frac{1}{f'}.$$

Preferably, the object –l may be designed to be equal to the minimum focal length $f_1'$ of the liquid crystal lens. According to the equation above, in a case that the focal length f' of the liquid crystal lens meets $f'=f_1'$, the image distance $l'=\infty$; in a case that the focal length f' of the liquid crystal lens meets $f'=f_2'=2f_1'$, the image distance $l'=-2f_1'$; and in a case that the focal length f' of the liquid crystal lens meets $f'=f_3'=3f_1'$, the image distance $l'=-1.5f_1$. In this manner, multi-spatial-depth imaging can be achieved.

The display module in this aspect may be a liquid crystal display (LCD), an organic light emitting diode (OLED) or any other module with a display function. For example, the display module may be a built-in display of an AR device, or a portable display module such as a cellphone or a tablet computer which can be inserted into a display apparatus.

In the display apparatus according to the foregoing embodiments, step-shaped annular electrodes are provided, which renders the liquid crystal lens equivalent to a Fresnel lens, and the electrodes can be made relatively thin, where a thickness of the liquid crystal lens is comparable to the wavelength of the incident light, which facilitates lightening and thinning of the liquid crystal lens. The focal length of the liquid crystal lens can be adjusted by controlling power supply states of respective annular electrodes, and thereby an image displayed on the display module can be further imaged in multiple spatial depths. In addition, the liquid crystal lens can be combined with a light guide structure, and the light guide structure can guide imaging light into an eye of a user, thereby achieving VR display with multiple spatial depths of imaging; or the light guide structure may also guide the imaging light and real ambient light both into the eye of the user, thereby achieving AR display with multiple spatial depths of imaging. The liquid crystal lens has a flat structure, where multiple adjustable focal lengths can be achieved without involvement of multiple lenses, and it also has a smaller spatial volume, which facilitates combination with the display module and the light guide module, and enables flattening of the whole device.

A method for controlling a display device is further provided according to some embodiments of the present disclosure. The display device includes a liquid crystal lens with multiple adjustable focal lengths, which include: a first transparent electrode layer and a second transparent electrode layer which are arranged in a stacked manner; and a liquid crystal layer between the first transparent electrode layer and the second transparent electrode layer. The second transparent electrode layer includes a first electrode sub-layer and a second electrode sub-layer which are arranged in a stacked manner. The first electrode sub-layer includes N concentric first annular electrodes, and the second electrode sub-layer includes N concentric second annular electrodes, where N is a positive integer, and the first annular electrodes and the second annular electrodes are alternately spaced in a direction parallel with the first transparent electrode layer.

The method includes:

powering on the first transparent electrode layer; and dividing the 2N annular electrodes layer into x electrode groups, where each electrode group includes m adjacent annular electrodes and x=int(2N/m); numbering the x electrode groups in sequence in a radial direction starting from a center of the annular electrode, and powering off the odd-numbered electrode groups and powering on the even-numbered electrodes groups, whereby an equivalent focal length of the liquid crystal lens with a plurality of adjustable focal lengths is:

$$f_j = m^* f_1',$$

where $f_1$ is a minimum focal length of the liquid crystal lens, and m is a positive integer smaller than N.

For example, as shown in FIGS. 2 and 5, the 2N annular electrodes are divided into N electrode groups with each group including two adjacent annular electrodes, the electrodes $A_1$ and $B_1$ of a first electrode group are powered off, the electrodes $A_2$ and $B_2$ of a second electrode group are powered on, the electrodes $A_3$ and $B_3$ of a third electrode group are powered off, and so on. That is, electrode groups with odd serial numbers are powered off and electrode groups with even serial numbers are powered on. In this way, an equivalent focal length of the liquid crystal lens is $f_2 = 2f_1'$.

In another example, the 2N annular electrodes are divided into int(2N/3) electrode groups with each group including three adjacent annular electrodes, the electrodes $A_1$, $B_1$ and $B_2$ of a first electrode group are powered off, the electrodes $A_2$, $B_3$ and $A_3$ of a second electrode group are powered on, the electrodes $B_4$, $A_4$ and $B_5$ of a third electrode group are powered off and so on. In this way, an equivalent focal length of the liquid crystal lens is $f_3=3f_1'$. By this method of focal length switching, the liquid crystal lens can have a series of focal lengths such as $f_4=4f_1'$, $f_5=5f_1'$ and $f_6=6f_1'$. The focal length of the liquid crystal lens can be adjusted by controlling power supply states of respective annular electrodes. VR display can be achieved by forming images with different spatial depths for an image displayed on the display module, and multi-spatial-depth AR display can be achieved by guiding imaging light and real ambient light into an eye of a user.

The first transparent electrode layer is of a single-layer plate-like structure. During displaying an image, the first transparent electrode layer is kept powered on, and the first annular electrodes A and the second annular electrodes B are independently controlled to be powered on, so that liquid crystal molecules located corresponding to different electrodes have different refractive indexes, and thereby the lens may have different focal lengths. The liquid crystal lens has a simple structure and powering of the electrodes can be easily controlled.

Unless otherwise defined, technical terms or scientific terms used in the present disclosure should be interpreted according to common meanings thereof as commonly understood by those of ordinary skills in the art. Such terms as "first", "second" and the like used in the present disclosure do not represent any order, quantity or importance, but are merely used to distinguish different components. Such terms as "including", or "comprising" and the like mean that an element or an article preceding the term contains elements or items and equivalents thereof behind the term, but does not exclude other elements or items. Such terms as "connected", or "interconnected" and the like are not limited to physical or mechanical connections, but may include electrical connections, whether direct connection or indirect connection. Such terms as "on", "under", "left", "right" and the like are only used to represent a relative position relationship, and when an absolute position of a described object is changed, the relative position relationship thereof may also be changed accordingly.

It may be understood that when an element such as a layer, a film, a region or a substrate is referred to as being "on" or "under" another element, the element may be "directly" "on" or "under" the another element, or there may exist an intervening element.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A display apparatus, comprising:
a light guide module comprising a light incident region and a light emergent region;
a display module, arranged corresponding to the light incident region of the light guide module and configured to display images; and
a liquid crystal lens with a plurality of adjustable focal lengths, arranged between the display module and the light guide module and corresponding to the light incident region of the light guide module, and configured to form virtual images with different depths of field for the images displayed on the display module,
wherein the light guide module is configured to guide light exited from the liquid crystal lens to propagate in a direction from the light incident region to the light emergent region within the light guide module,
wherein the liquid crystal lens comprises:
a first transparent electrode layer and a second transparent electrode layer that are stacked; and
a liquid crystal layer between the first transparent electrode layer and the second transparent electrode layer;
wherein the second transparent electrode layer comprises a first electrode sub-layer and a second electrode sub-layer that are stacked in sequence; and
the first transparent electrode layer is of a plate-like structure, the first electrode sub-layer comprises N concentric first annular electrodes, and the second electrode sub-layer comprises N concentric second annular electrodes, wherein N is a positive integer, and the first annular electrodes and the second annular electrodes are alternately spaced in a direction parallel with the first transparent electrode layer,
wherein a first non-electrode region is formed between each two adjacent first annular electrodes, a second non-electrode region is formed between each two adjacent second annular electrodes, and
orthographic projections of the first annular electrodes on a first transparent substrate coincide with orthographic projections of second non-electrode regions on the first transparent substrate,
wherein the N concentric first annular electrodes, the N concentric second annular electrodes and the liquid crystal layer form N equivalent phase grating units, and each equivalent phase grating unit comprises two steps, wherein a first step of the two steps corresponds to the first annular electrode and a second step of the two steps corresponds to the second annular electrode;
an outer diameter of a first step of a $j^{th}$ equivalent phase grating unit is:

$$r_{j,1} = \sqrt{\frac{(2j-1)f_1'\lambda}{n_2}\left(1 - \frac{(2j-1)\lambda}{4n_2 f_1'}\right)^{1/2}};$$

an outer diameter of a second step of the $j^{th}$ equivalent phase grating unit is:

$$r_{j,2} = \sqrt{\frac{2jf_1'\lambda}{n_2}\left(1 - \frac{j\lambda}{2n_2 f_1'}\right)^{1/2}};$$

wherein $f_1'$ is a focal length of the liquid crystal lens, $\lambda$ is a wavelength of incident light, $n_2$ is a refractive index of an external medium in contact with a surface of the liquid crystal lens, j is a serial number of an equivalent phase grating unit numbered in such a manner as to increase in a radial direction starting from a center of the equivalent phase grating units;
a width of a $j^{th}$ first annular electrode is:

$$d_{j,1} = r_{j,1} - r_{j-1,2};\text{ and}$$

a width of a $j^{th}$ second annular electrode is:

$$d_{j,2} = r_{j,2} - r_{j,1}.$$

2. The display apparatus according to claim 1, wherein a thickness of the liquid crystal layer is:

$$d = \frac{\lambda/2}{n_e - n_o},$$

wherein $n_e$ is a liquid crystal refractive index for incident light with a polarization direction parallel with a long axis of a liquid crystal molecule in the liquid crystal layer, and $n_o$ is a liquid crystal refractive index for incident light with a polarization direction perpendicular to the long axis of the liquid crystal molecule in the liquid crystal layer.

3. The display apparatus according to claim 1, further comprising a power supply module, wherein each first annular electrode and each second annular electrode are respectively provided with power supply wires, and the power module is configured to control power supply states of each first annular electrode and each second annular electrode independently through respective power supply wires to achieve the plurality of adjustable focal lengths of the liquid crystal lens.

4. The display apparatus according to claim 3, wherein the power supply module is configured to:
power on the first transparent electrode layer; and
divide the 2N annular electrodes in the second transparent electrode layer into x electrode groups, wherein each electrode group comprises m adjacent annular electrodes and x=int (2N/m), number the x electrode groups in sequence in a radial direction starting from a center of the annular electrode, and power off the odd-numbered electrode groups and power on the even-numbered electrodes groups, whereby an equivalent focal length of the liquid crystal lens is:

$$f_m = m * f_1,$$

wherein $f_1$ is a minimum focal length of the liquid crystal lens and m is a positive integer smaller than N.

5. The display apparatus according to claim 1, wherein the liquid crystal lens further comprises a polarizer at a side of the first transparent electrode layer or the second transparent electrode layer close to the display module, wherein a transmission axis of the polarizer is parallel with an initial alignment orientation of liquid crystal molecules in the liquid crystal layer.

6. The display apparatus according to claim 1, wherein the liquid crystal lens further comprises a first transparent substrate at a side of the first transparent electrode layer away from the liquid crystal layer, and a second transparent substrate at a side of the second transparent electrode layer away from the liquid crystal layer, wherein a polarizer is arranged at a side of the second transparent substrate away from the second transparent electrode layer.

7. The display apparatus according to claim 1, wherein the light guide module comprises:
a light guide plate;
a light guide-in grating, arranged corresponding to the light incident region and at a side of the light guide plate facing away from the liquid crystal lens, and configured to guide light from the liquid crystal lens into the light guide plate; and
a light guide-out grating, arranged corresponding to the light emergent region and at a same side with the light guide-in grating, and configured to guide the light in the light guide plate to an eye of a user.

8. The display apparatus according to claim 7, wherein ambient light is incident on a side of the light guide-out grating away from the eye of the user, and the light guide-out grating is configured to guide zero-order diffraction light of the ambient light into the eye of the user.

9. The display apparatus according to claim 7, wherein a maximum half angle of view of the display apparatus is:

$$\omega(d)_{max} = \arcsin\left(\frac{n-1}{2}\right),$$

wherein $\omega(d)_{max}$ is the maximum half angle of view, n is a refractive index of the light guide plate, and a grating constant corresponding to the maximum half angle of view is $$d = \frac{2\lambda}{n+1}.$$

10. The display apparatus according to claim 1, wherein the light guide module comprises a first polarizing splitter prism and a second polarizing splitter prism respectively at the light incident region and the light emergent region,
wherein the first polarizing splitter prism is configured to reflect light from the liquid crystal lens to the second polarizing splitter prism, and the second polarizing splitter prism is configured to reflect light from the first polarizing splitter prism into an eye of a user.

11. The display apparatus according to claim 10, wherein the second polarizing splitter prism is further configured to transmit ambient light into the eye of the user.

12. The display apparatus according to claim 1, wherein a distance between the display module and the liquid crystal lens is smaller than or equal to the minimum focal length adjustable of the liquid crystal lens.

13. A method for controlling a display apparatus, wherein the display apparatus comprises a liquid crystal lens with a plurality of adjustable focal lengths, and the liquid crystal lens comprises a first transparent electrode layer and a second transparent electrode layer which are arranged in a stacked manner and a liquid crystal layer between the first transparent electrode layer and the second transparent electrode layer, wherein the second transparent electrode layer comprises a first electrode sub-layer and a second electrode sub-layer which are arranged in a stacked manner, the first electrode sub-layer comprises N concentric first annular electrodes, and the second electrode sub-layer comprises N concentric second annular electrodes, wherein N is a positive integer, and the first annular electrodes and the second annular electrodes are alternately spaced in a direction parallel with the first transparent electrode layer;
wherein the method comprises:
power on the first transparent electrode layer; and
dividing the 2N annular electrodes layer into x electrode groups, wherein each electrode group comprises m adjacent annular electrodes and x=int (2N/m); numbering the x electrode groups in sequence in a radial direction starting from a center of the annular electrode, and powering off the odd-numbered electrode groups and powering on the even-numbered electrodes groups, whereby an equivalent focal length of the liquid crystal lens with a plurality of adjustable focal lengths is:

$$f_m = m * f_1,$$

wherein $f_1$ is a minimum focal length of the liquid crystal lens and m is a positive integer smaller than N, wherein a first non-electrode region is formed between each two adjacent first annular electrodes, a second non-electrode region is formed between each two adjacent second annular electrodes, and orthographic projections of the first annular electrodes on a first transparent substrate coincide with orthographic projections of the second non-electrode regions on the first transparent substrate, wherein the N concentric first annular electrodes, the N concentric second annular electrodes and the liquid crystal layer form N equivalent phase grating units, and each equivalent phase grating unit comprises two steps, wherein a first step of the two steps corresponds to the first annular electrode and a second step of the two steps corresponds to the second annular electrode;

an outer diameter of a first step of a $j^{th}$ equivalent phase grating unit is:

$$r_{j,1} = \sqrt{\frac{(2j-1)f_1'\lambda}{n_2}} \left(1 - \frac{(2j-1)}{4n_2 f_1'}\right)^{1/2};$$

an outer diameter of a second step of the $j^{th}$ equivalent phase grating unit is:

$$r_{j,2} = \sqrt{\frac{2jf_1'\lambda}{n_2}} \left(1 - \frac{j\lambda}{2n_2 f_1'}\right)^{1/2};$$

wherein $f_1'$ is a focal length of the liquid crystal lens, $\lambda$ is a wavelength of incident light, $n_2$ is a refractive index of an external medium in contact with a surface of the liquid crystal lens, j is a serial number of an equivalent phase grating unit numbered in such a manner as to increase in a radial direction starting from a center of the equivalent phase grating units;

a width of a $j^{th}$ first annular electrode is:

$$d_{j,1} = r_{j,1} - r_{j-1,2}; \text{ and}$$

a width of a $j^{th}$ second annular electrode is:

$$d_{j,2} = r_{j,2} - r_{j,1}.$$

14. The method according to claim 13, wherein a thickness of the liquid crystal layer is:

$$d = \frac{\lambda/2}{n_e - n_o},$$

wherein $n_e$ is a liquid crystal refractive index for incident light with a polarization direction parallel with a long axis of a liquid crystal molecule in the liquid crystal layer, and $n_o$ is a liquid crystal refractive index for incident light with a polarization direction perpendicular to the long axis of the liquid crystal molecule in the liquid crystal layer.

15. The method according to claim 13, wherein the display apparatus further comprises a display module, and a distance between the display module and the liquid crystal lens is smaller than or equal to the minimum focal length adjustable of the liquid crystal lens.

16. A display apparatus, comprising:
a light guide module comprising a light incident region and a light emergent region;
a display module, arranged corresponding to the light incident region of the light guide module and configured to display images; and
a liquid crystal lens with a plurality of adjustable focal lengths, arranged between the display module and the light guide module and corresponding to the light incident region of the light guide module, and configured to form virtual images with different depths of field for the images displayed on the display module,
wherein the light guide module is configured to guide light exited from the liquid crystal lens to propagate in a direction from the light incident region to the light emergent region within the light guide module,
wherein the light guide module comprises:
a light guide plate;
a light guide-in grating, arranged corresponding to the light incident region and at a side of the light guide plate facing away from the liquid crystal lens, and configured to guide light from the liquid crystal lens into the light guide plate; and
a light guide-out grating, arranged corresponding to the light emergent region and at a same side with the light guide-in grating, and configured to guide the light in the light guide plate to an eye of a user,
wherein a maximum half angle of view of the display apparatus is:

$$\omega(d)_{max} = \arcsin\left(\frac{n-1}{2}\right),$$

wherein $\omega(d)_{max}$ is the maximum half angle of view, n is a refractive index of the light guide plate, and a grating constant corresponding to the maximum half angle of view is $$d = \frac{2\lambda}{n+1}.$$

* * * * *